(12) United States Patent
Kang (10) Patent No.: US 10,121,994 B2
(45) Date of Patent: Nov. 6, 2018

(54) SECONDARY BATTERY AND METHOD FOR MANUFACTURING THE SAME

(71) Applicant: SK INNOVATION CO., LTD., Seoul (KR)

(72) Inventor: Hee-Gyoung Kang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 24 days.

(21) Appl. No.: 15/196,703

(22) Filed: Jun. 29, 2016

(65) Prior Publication Data

US 2016/0380245 A1 Dec. 29, 2016

(30) Foreign Application Priority Data

Jun. 29, 2015 (KR) .......................... 10-2015-0091847

(51) Int. Cl.

| | |
|---|---|
| *H01M 10/052* | (2010.01) |
| *H01M 2/02* | (2006.01) |
| *H01M 10/04* | (2006.01) |
| *H01M 2/10* | (2006.01) |
| *H01M 2/26* | (2006.01) |

(52) U.S. Cl.
CPC ....... *H01M 2/0267* (2013.01); *H01M 2/0207* (2013.01); *H01M 2/0275* (2013.01); *H01M 2/1016* (2013.01); *H01M 10/0431* (2013.01); *H01M 2/263* (2013.01)

(58) Field of Classification Search
CPC .................. H01M 10/052; H01M 10/0525
See application file for complete search history.

(56) References Cited

U.S. PATENT DOCUMENTS

2012/0121963 A1\* 5/2012 Kwon ................ H01M 2/0275
429/127

FOREIGN PATENT DOCUMENTS

| CN | 102290536 | 12/2011 |
|---|---|---|
| CN | 206225480 | 6/2017 |
| JP | 2011096418 | 5/2011 |
| KR | 1020070102768 | 10/2007 |
| KR | 1020110065923 | 6/2011 |
| KR | 1020120008297 | 1/2012 |
| KR | 1020150061990 | 6/2015 |
| WO | WO 2007/119950 | 10/2007 |

OTHER PUBLICATIONS

Notice of Allowance issued by the Korean Intellectual Property Office dated Nov. 13, 2017.

(Continued)

*Primary Examiner* — Olatunji A Godo
(74) *Attorney, Agent, or Firm* — IP & T Group LLP (57) ABSTRACT

Disclosed are a secondary battery and a method for manufacturing the same. According to an embodiment of the present invention, there is provided a secondary battery, including: an exterior material which includes a pouch film and a sealing portion formed at an outer side of the pouch film; and an electrode assembly which includes a plurality of electrode bodies laminated with a separator interposed therebetween and are packaged by the exterior material, wherein a pair of forming portions are formed within the pouch film to house the electrode assembly, and a predetermined interval is formed between the pair of forming portions.

36 Claims, 4 Drawing Sheets

(56) References Cited

OTHER PUBLICATIONS

Office Action issued by the Korean Intellectual Property Office dated Mar. 22, 2016.
Office Action issued by the Korean Intellectual Property Office dated Aug. 5, 2016.
Office Action issued by the State Intellectual Property Office dated May 3, 2018.

* cited by examiner

SECONDARY BATTERY AND METHOD FOR MANUFACTURING THE SAME

BACKGROUND OF THE INVENTION

1. Field of the Invention

The present invention relates to a secondary battery and a method for manufacturing the same in embodiments thereof.

2. Description of the Related Art

Recently, a lithium secondary battery, which is rechargeable and lightweight and has a high energy and power density, has been widely used as an energy source for wireless mobile devices. Further, as a solution to the problems such as air pollution and the greenhouse house effect which are caused by existing internal combustion engine vehicles using fossil fuels such as a gasoline vehicle and a diesel vehicle, a hybrid electric vehicle (HEV), a plug-in hybrid electric vehicle (PHEV), a battery electric vehicle (BEV), an electric vehicle (EV), or the like have been proposed. The lithium secondary battery may serve as a power source for the alternative vehicles.

The lithium secondary battery is classified into a lithium ion battery using a liquid electrolyte and a lithium polymer battery using a polymer electrolyte in terms of a type of electrolytic solutions. The lithium secondary battery is also classified into cylindrical, prismatic, and a pouch shapes in terms of a shape of an exterior material in which an electrode assembly is housed.

Among these, the pouch type lithium secondary battery is made of a metal layer (foil) and a pouch film which is formed of multi-layered synthetic resin layers and coated on upper and lower surfaces of the metal layer, the weight of the pouch type lithium secondary battery may be remarkably lighter than that of the cylindrical lithium secondary battery or the prismatic lithium secondary battery using a metallic can. Thus, the pouch type lithium secondary battery may be lightweight and may be amenable to a change in shape.

Figure 1:
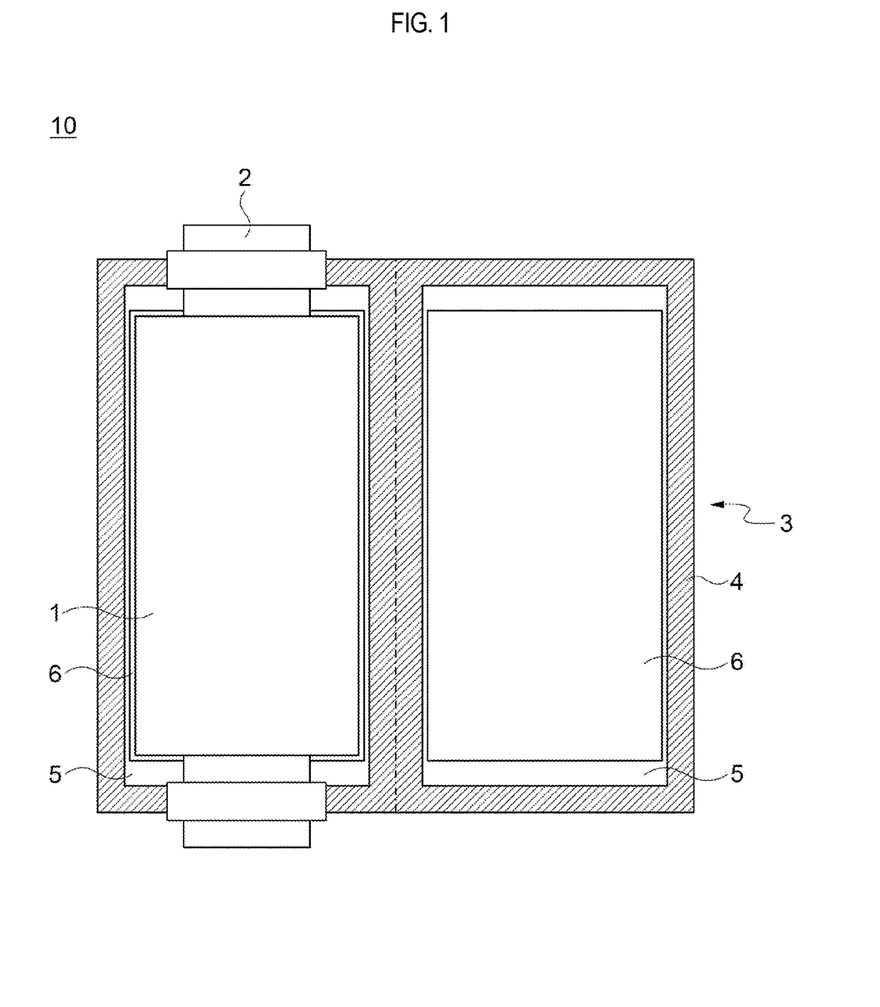
FIG. 1 is a development view of a conventional pouch type secondary battery.
Figure 2:
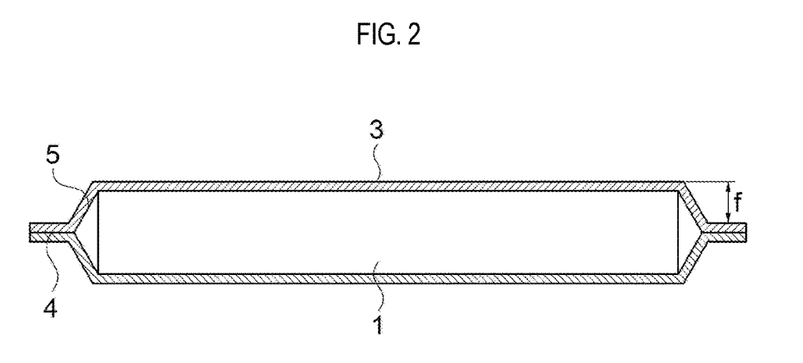
FIG. 2 is a cross-sectional view of the pouch type secondary battery of FIG. 1.

FIG. 1 is a development view of a conventional pouch shape secondary battery 10 which is disclosed in Korean Patent Laid-Open Publication No. 10-2013-0089614 (2013 Aug. 12), and FIG. 2 is a cross-sectional view of the pouch shape secondary battery 10 of FIG. 1.

Referring to FIGS. 1 and 2, the pouch shape secondary battery 10 is formed by packaging an electrode assembly 1, to which an electrode tab 2 is attached, with an exterior material 3. The exterior material 3 includes a sealing portion 4 and a pair of pouch films 5. Each of the pair of pouch films 5 includes a forming portion 6 to house the electrode assembly 1. When a middle portion of the exterior material 3 is folded, upper and lower parts of the electrode assembly 1 are housed in the pair of forming portions 6.

The forming portion 6 is formed by pressing an inside of the pouch film 5 with a press or the like to allow the pouch film 5 to have a predetermined depth. In this regard, the depth at which the forming portion 6 may be formed about 7 mm at maximum, and therefore a thickness of the electrode assembly 1 housed in the forming portion 6 has also a depth limitation (about 14 mm). Therefore, a capacity of the secondary battery 10 has a limitation.

SUMMARY OF THE INVENTION

An object of the present invention is to provide a secondary battery and a method for manufacturing the same capable of increasing a thickness of a secondary battery cell in embodiments thereof.

Another object of the present invention is to provide a high-capacity secondary battery and a method for manufacturing the same by solving a limitation in a thickness of a secondary battery cell in embodiments thereof.

In addition, another object of the present invention is to provide a secondary battery and a method for manufacturing the same capable of actually increasing an energy density within the same volume by reducing a sealing side face in embodiments thereof.

According to one embodiment of the present invention, there is provided a secondary battery, including: an exterior material which includes a pouch film and a sealing portion formed at an outer side of the pouch film; and an electrode assembly which includes a plurality of electrode bodies stacked with a separator interposed therebetween and are packaged by the exterior material, wherein a pair of forming portions are formed within the pouch film to house the electrode assembly, and a predetermined interval is formed between the pair of forming portions.

The pair of forming portions may face each other with the electrode assembly interposed therebetween.

Each of the pair of forming portions may have a predetermined depth, and a thickness of the electrode assembly may have a relationship between the predetermined interval and a predetermined depth represented by Equation 1 below:

$$t \leq T + 2f \qquad \text{[Equation 1]}$$

Here, t denotes the thickness of the electrode assembly, T denotes the predetermined interval between the pair of forming portions, and f denotes the predetermined depths of each of the pair of forming portions.

The predetermined interval may be a range of exceeding from 0 mm but 20 mm or less.

Lateral intervals between the pair of forming portions and outermost parts of the pouch film may be a half (½) or more of the predetermined interval.

Both sides of the electrode assembly may be respectively provided with electrode tabs connected through a welding portion, and longitudinal intervals between the pair of forming portions and outermost parts of the pouch film may be a sum or more of the half (½) of the predetermined interval and a width of the welding part.

According to another embodiment of the present invention, there is provided a method for manufacturing a secondary battery, including: forming a pair of forming portions within a pouch film of an exterior material which includes the pouch film and a sealing portion formed at an outer side of the pouch film; housing an electrode assembly which includes a plurality of electrode bodies stacked with a separator interposed therebetween and packaged by the exterior material within the pair of forming portions; and sealing the sealing portions positioned at both sides with the electrode assembly interposed therebetween.

A predetermined interval may be formed between the pair of forming portions.

Each of the pair of forming portions may have a predetermined depth, and a thickness of the electrode assembly may have a relationship between the predetermined interval and a predetermined depth represented by Equation 1 below:

$$t \leq T + 2f \qquad \text{[Equation 1]}$$

Here, t denotes the thickness of the electrode assembly, T denotes the predetermined interval between the pair of forming portions, and f denotes the predetermined depths of each of the pair of forming portions.

The predetermined interval may be a range of exceeding from 0 mm but 20 mm or less.

Lateral intervals between the pair of forming portions and outermost parts of the pouch film may be a half (½) or more of the predetermined interval.

Both sides of the electrode assembly may be respectively provided with electrode tabs connected through a welding portion, and longitudinal intervals between the pair of forming portions and outermost parts of the pouch film may be a sum or more of the half (½) of the predetermined interval and a width of the welding part.

According to the embodiments of the present invention, it is possible to increase the thickness of the secondary battery cell by forming the pair of forming portions within one pouch film and forming a predetermined interval between the pair of forming portions.

According to the embodiments of the present invention, it is possible to manufacture the high-capacity secondary battery by solving the limitation in the thickness of the secondary battery cell.

Further, according to the embodiment of the present invention, it is possible to actually increase the energy density within the same volume by reducing the sealing side face.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. But, these are only an example, and the present invention is not limited thereto.

In description of the present invention, detailed description of the publicly known functions and configurations that are judged to be able to make the purport of the present invention unnecessarily obscure are omitted. In addition, terms or words used in the specification and claims should not be construed as limited to a lexical meaning, and should be understood as appropriate notions by the inventor based on that he/she is able to define terms to describe his/her invention in the best way to be seen by others.

However, those skilled in the art will appreciate that such embodiments are provided for illustrative purposes and do not limit subject matters to be protected as disclosed in the detailed description and appended claims. Therefore, it will be apparent to those skilled in the art that various alterations and modifications of the embodiments are possible within the scope and spirit of the present invention and duly included within the range as formed by the appended claims.

Figure 3:
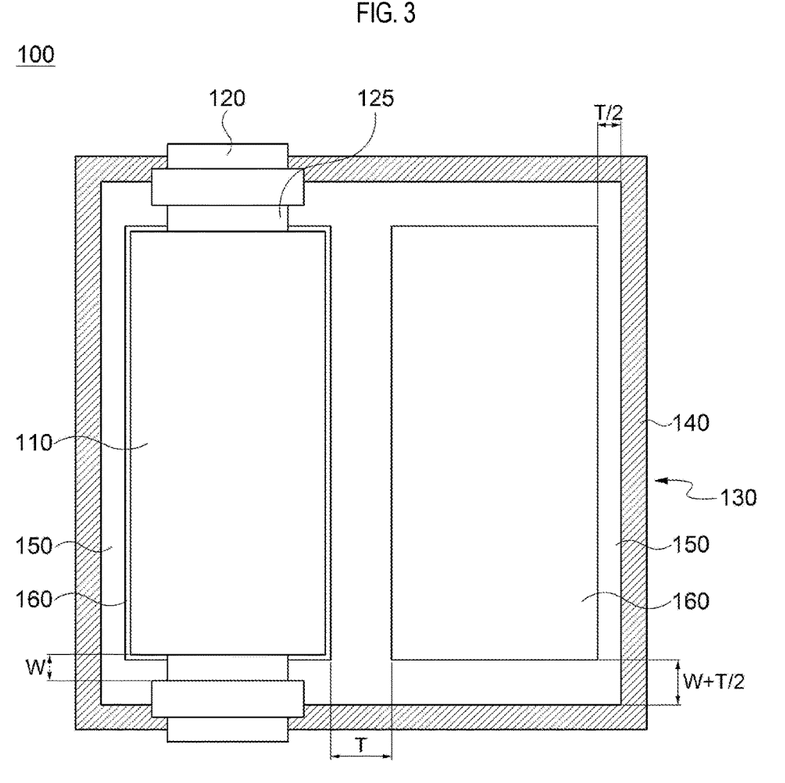
FIG. 3 is a development view of a secondary battery according to an embodiment of the present invention.

FIG. 3 is a development view of a secondary battery 100 according to an embodiment of the present invention.

Referring to FIG. 3, the secondary battery 100 includes an electrode assembly 110 including a plurality of electrode bodies which are stacked and a separator interposed between the plurality of electrode bodies. To package the electrode assembly 110, an exterior material 130 including a pouch film 150 and a sealing portion 140 formed on an outer circumference of the pouch film 150 may be used.

The secondary battery 100 may be a pouch type secondary battery. The electrode assembly 110 may be a jelly roll in an oval shape or the like in which cathode plates and anode plates are alternately stacked with each other with the separator interposed therebetween. Both ends of the electrode assembly 110 have electrode tabs 120, and welding portions 125 may be formed between the electrode tab 120 and the electrode assembly 110 to connect these parts with each other.

The pouch film 150 may include aluminum. The reason of using the aluminum in the pouch film 150 is to resist severe thermal environments, mechanical impacts, or the like as well as to achieve miniaturization, weight reduction, and slimness.

The pouch film 150 includes a pair of forming portions 160 for housing the electrode assembly 110. The forming portion 160 may be in a recessed shape, and may be formed by pressing the inside of the pouch film 150 or the like.

However, when the forming portion 160 is pressed too hard, the pouch film 150 may be damaged, and therefore the depth of the forming portion 160 is limited. As a result, in the conventional secondary battery, the thickness of the electrode assembly 110 housed in the forming portion 160 is also limited due to the limitation in the depth of the forming portion 160.

According to the embodiments of the present invention, the pair of forming portions 160 may be formed in the pouch film 150, and a predetermined interval T may be formed between the pair of forming portions 160. Further, the secondary battery may be formed by placing one side of the electrode assembly 110 within one forming portion 160, and then wrapping the other side of the electrode assembly 110 with the other forming portion 160. An extra space is additionally generated as much as the predetermined interval T formed between the pair of forming portions 160, and thus the thickness of a space, in which the electrode assembly 110 is received, may be increased as much as the predetermined interval T.

Herein, the pair of forming portions 160 may face each other and the electrode assembly 110 is interposed therebetween. Further, the predetermined interval may be in a range between 0 mm, exclusive, and 20 mm, inclusive.

As illustrated in FIG. 3, a lateral distance between each of the pair of forming portions 160 and the sealing portion 140 may a half (½) or more of the predetermined interval T. When the pouch film 150 is wrapped, the pair of forming portions 160 and both sides of the outermost part of the pouch film 150 abut each other. Therefore, it is preferable that each of the lateral intervals is the half (½) or more of the predetermined interval T.

Further, a longitudinal distance between each of the forming portions 160 and the outermost part of the pouch film 150 may be W+T/2 or more. Here, W is a width of the welding portion 125.

Figure 4:
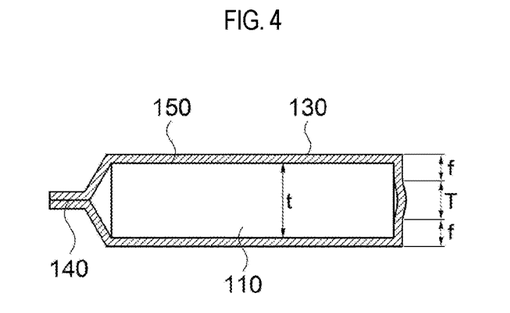
FIG. 4 is a cross-sectional view of a secondary battery according to an embodiment of the present invention.

FIG. 4 is a cross-sectional view of the secondary battery 100 according to the embodiment of the present invention. Referring to FIG. 4, the secondary battery 100 may be formed by packaging the electrode pouch 110 with the exterior material 130 including the pouch film 150. The secondary battery 100 may be sealed with a sealing portion 140 formed at an outer side of the exterior material 130.

A thickness t of the electrode assembly 110 within the secondary battery 100 may be represented by Equation 1 below:

$$t \leq T + 2f \qquad \text{[Equation 1]}$$

Here, f is a depth of each of the forming portions 160.

The above relationship Equation 1 may be expressed as illustrated in FIG. 4. Therefore, the thickness t of the electrode assembly 110 may be thicker than the conventional secondary battery, and it is possible to manufacture the secondary battery 100 having a thickness of 14 mm or more that may not be achieved in the related art.

Further, as illustrated in FIG. 4, only one of two long edges of the secondary battery 100 may be sealed with the sealing portion 140. Therefore, the energy density within the same volume may be increased as much as the sealed surface is reduced.

Figure 5:
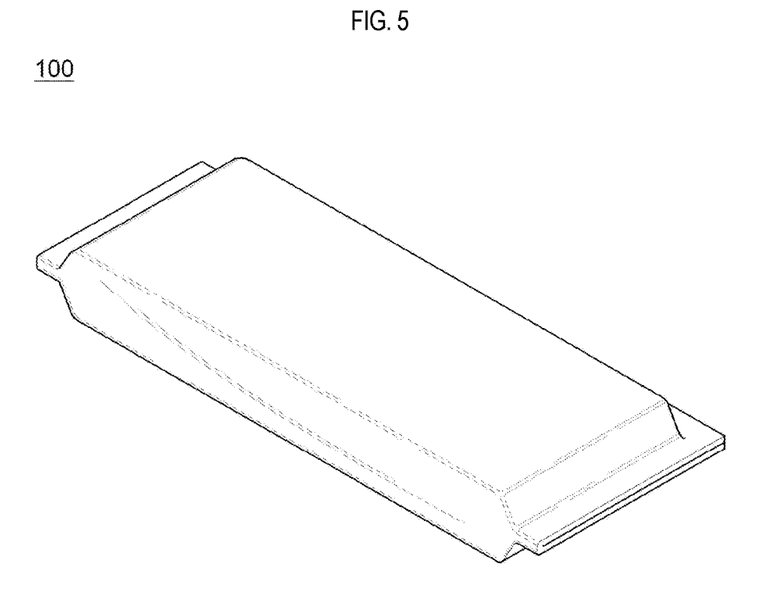
FIG. 5 is a perspective view of a secondary battery according to an embodiment of the present invention.

FIG. 5 is a perspective view of the secondary battery 100 according to the embodiment of the present invention.

Referring to FIG. 5, in the secondary battery 100 of the present invention, the thickness of the electrode assembly 110 is not limited due to a depth of the forming portion 160. The thickness of the electrode assembly 110 may be formed thicker due to the interval present between the forming portions 160. Thereby, the capacity of the secondary battery 100 may be increased. Further, the energy density may be actually increased by reducing a sealing area of the secondary battery 100.

Hereinafter, a method for manufacturing a secondary battery 100 according to an embodiment of the present invention will be described.

First, the pouch film 150 and the exterior material 130 including the sealing portion 140 formed at the outer side of the pouch film 150 may be prepared. The pair of forming portions 160 may be formed within the pouch film 150. The predetermined interval may be formed between the pair of forming portions 160 and the predetermined interval may be in a range between 0 mm, exclusive, and 20 mm, inclusive. Further, the interval between each of the pair of forming portions 160 and the sealing portion 140 may a half (½) or more of the predetermined interval.

Next, the electrode assembly 110 may be housed within the pair of forming portions 160. In this case, the secondary battery may be formed by placing the electrode assembly 110 over one forming portion 160, and then wrapping the electrode assembly 110 with the other forming portion 160. Therefore, the extra space is additionally generated as much as the predetermined interval T, which is a distance between the forming portions 160. Thus, the thickness of the electrode assembly 110 may be increased as much as the predetermined interval T.

Further, the sealing portions 140 are attached to each other so that the electrode assembly 110 is enclosed within the pouch film 150.

While the present invention has been described with reference to the preferred embodiments, it will be understood by those skilled in the related art that various modifications and variations may be made therein without departing from the scope of the present invention as formed by the appended claims. Therefore, the scope of the present invention should not be formed by the described embodiment but should be formed by the appended claims and their equivalents.

DESCRIPTION OF REFERENCE NUMERALS

100: secondary battery
110: electrode assembly
120: electrode tab
125: welding portion
130: exterior material
140: sealing portion
150: pouch film
160: forming portion

What is claimed is:

1. A secondary battery, comprising:
an exterior material which includes a pouch film and a sealing portion formed at an outer side of the pouch film; and
an electrode assembly which includes a plurality of electrode bodies laminated with a separator interposed therebetween,
wherein a pair of forming portions are formed within the pouch film to house the electrode assembly, and
wherein the electrode assembly is packaged by the exterior material in a manner that three sides of the exterior material are sealed and one side is not sealed, and a thickness of the electrode assembly is larger than a sum of each depth of the pair of forming portions.

2. The secondary battery of claim 1, wherein the pair of forming portions face each other with the electrode assembly interposed therebetween.

3. The secondary battery of claim 1, wherein a predetermined interval is formed between the pair of forming portions, and
wherein a thickness of the electrode assembly has a relationship between the predetermined interval and a predetermined depth represented by Equation 1 below:

$$t \leq T + 2f \qquad \text{[Equation 1]}$$

wherein t denotes the thickness of the electrode assembly, T denotes the predetermined interval between the pair of forming portions, and f denotes the predetermined depths of each of the pair of forming portions.

4. The secondary battery of claim 3, wherein the predetermined interval is greater than 0 and equal to or less than 20 mm.

5. The secondary battery of claim 1, wherein lateral intervals between the pair of forming portions and the sealing portion are a half (½) or more of the predetermined interval.

6. The secondary battery of claim 1, wherein both sides of the electrode assembly are respectively provided with electrode tabs connected through a welding portion, and
wherein longitudinal intervals between the pair of forming portions and the sealing portion are a sum or more of the half (½) of the predetermined interval and a width of the welding part.

7. The secondary battery of claim 1, wherein the side of the exterior material that is not sealed is a folded side.

8. The secondary battery of claim 7, wherein an inclination angle by the exterior material at an edge of the electrode assembly positioned at the sealed side is larger than an inclination angle by the exterior material at an edge of the electrode assembly positioned at the folded side.

9. The secondary battery of claim 7, wherein an inclination angle by the exterior material at an edge of the electrode assembly positioned at the folded side is 90~95 degrees.

10. The secondary battery of claim 7, wherein the electrode assembly and the exterior material at the folded side are in contact with each other.

11. The secondary battery of claim 1,
wherein the pouch film is formed of a single body and is in a folded shape, wherein a first area, a second area, a third area, a fourth area, and a fifth area are sequentially arranged between a first edge and a second edge of the pouch film in a first direction, wherein the first area and the fifth area, in combination, form a first sidewall of the exterior material, wherein the second area forms a bottom layer of the exterior material, wherein the third area forms a second sidewall of the exterior material, wherein the fourth area forms an upper layer of the exterior material, wherein the sealing portion is provided over the first edge, the second edge, or both, wherein the first edge and the second edge meet each other on the first sidewall and are bonded to each other by the sealing portion, wherein a first forming portion is formed in the second area of the pouch film and protrudes downward by a first thickness f1, wherein a second forming portion is formed in the fourth area of the pouch film and protrudes upward by a second thickness f2, wherein the electrode assembly is located between the first and the second forming portions and has a third thickness t, and wherein the third thickness t of the electrode assembly is larger than a sum of the first thickness f1 and the second thickness f2.

12. The secondary battery of claim 11,
wherein the first and the second forming portions face each other.

13. The secondary battery of claim 11,
wherein the third area of the pouch film has a first width T when measured along the first direction,
wherein the first thickness f1 is the same as the second thickness f2, and
wherein the third thickness t of the electrode assembly satisfies the following Equation $$t \leq T + 2f$$

wherein f=f1=f2.

14. The secondary battery of claim 13,
wherein a width of the first area is between T/2 and T, inclusive, when measured along the first direction, and
wherein a width of the fifth area is between T/2 and T, inclusive, when measured along the first direction.

15. The secondary battery of claim 13, further comprising:
an electrode tab provided between the electrode assembly and an outside of the pouch film; and
a welding portion coupling the electrode assembly to the electrode tab,
wherein the pouch film extends from a third edge through a sixth area, the second area, and a seventh area to a fourth edge in a second direction,
wherein the second direction is different from the first direction,
wherein the welding portion has a width W when measured along the second direction, and
wherein a width of the sixth area of the pouch film is the same as or larger than (W+T/2).

16. The secondary battery of claim 11,
wherein the first sidewall of the exterior material is formed with a seam, the seam being created by bonding the first edge and the second edge using the sealing portion, and wherein the second sidewall of the exterior material is formed seamless and without using the sealing portion.

17. The secondary battery of claim 16,
wherein the first sidewall has a first inclination with respect to the bottom layer,
wherein the second sidewall has a second inclination with respect to the bottom layer, and
wherein the second inclination is larger than the first inclination.

18. The secondary battery of claim 16, wherein the electrode assembly directly contacts the second sidewall of the exterior material.

19. A secondary battery, comprising:
an exterior material which includes a pouch film and a sealing portion formed at an outer side of the pouch film; and
an electrode assembly which includes a plurality of electrode bodies laminated with a separator interposed therebetween and are packaged by the exterior material,
wherein a pair of forming portions are formed within the pouch film to house the electrode assembly,
wherein the exterior material packages the electrode assembly in a manner that three sides of the exterior material are sealed, and one side is not sealed, and
wherein a space between the electrode assembly and the side of the exterior material that is not sealed is smaller than a space between the electrode assembly and at least one of the sides of the exterior material that are sealed.

20. The secondary battery of claim 19,
wherein the side that is not sealed is a side that the exterior material is folded around the electrode assembly,
wherein a side that faces the side that is not sealed is a side that exterior material is sealed, and
wherein the space between the side that is not sealed and the electrode assembly is smaller than a space between the side that faces the side that is not sealed and the electrode assembly.

21. The secondary battery of claim 19, wherein the pair of forming portions face each other with the electrode assembly interposed therebetween.

22. The secondary battery of claim 19, wherein a predetermined interval is formed between the pair of forming portions, and
wherein a thickness of the electrode assembly has a relationship between the predetermined interval and a predetermined depth represented by Equation 1 below:

$$t \leq T + 2f \qquad \text{[Equation 1]}$$

wherein t denotes the thickness of the electrode assembly, T denotes the predetermined interval between the pair of forming portions, and f denotes the predetermined depths of each of the pair of forming portions.

23. The secondary battery of claim 22, wherein the predetermined interval is greater than 0 mm and equal to or less than 20.

24. The secondary battery of claim 22, wherein lateral intervals between the pair of forming portions and the sealing portion are a half (½) or more of the predetermined interval.

25. The secondary battery of claim 19, wherein the electrode assembly is provided with electrode tabs connected through a welding portion, and wherein longitudinal intervals between the pair of forming portions and the sealing portion are a sum or more of the half (½) of the predetermined interval and a width of the welding part.

26. The secondary battery of claim 19, wherein an inclination angle of sealed side of the exterior material is larger than an inclination angle of the non-sealed side.

27. The secondary battery of claim 19, wherein the inclination angle of the non-sealed side is 90~95 degrees.

28. The secondary battery of claim 26, wherein the electrode assembly and the non-sealed side of the exterior material are in at least partial contact.

29. The secondary battery of claim 19,
wherein the pouch film is formed of a single body and is in a folded shape,
wherein a first area, a second area, a third area, a fourth area, and a fifth area are sequentially arranged between a first edge and a second edge of the pouch film in a first direction,
wherein the first area and the fifth area, in combination, form a first sidewall of the exterior material,
wherein the second area forms a bottom layer of the exterior material,
wherein the third area forms a second sidewall of the exterior material,
wherein the fourth area forms an upper layer of the exterior material,
wherein the sealing portion is provided over the first edge, the second edge, or both,
wherein the first edge and the second edge meet each other on the first sidewall and are bonded to each other by the sealing portion,
wherein a first forming portion is formed in the second area of the pouch film and protrudes downward by a first thickness f1,
wherein a second forming portion is formed in the fourth area of the pouch film and protrudes upward by a second thickness f2,
wherein the electrode assembly is located between the first and the second forming portions and has a third thickness t, and
wherein the third thickness t of the electrode assembly is larger than a sum of the first thickness f1 and the second thickness f2.

30. The secondary battery of claim 29,
wherein the first and the second forming portions face each other.

31. The secondary battery of claim 29,
wherein the third area of the pouch film has a first width T when measured along the first direction,
wherein the first thickness f1 is the same as the second thickness f2, and
wherein the third thickness t of the electrode assembly satisfies the following Equation 1:

$$t \leq T + 2f$$ [Equation 1]

wherein f=f1=f2.

32. The secondary battery of claim 31,
wherein a width of the first area is between T/2 and T, inclusive, when measured along the first direction, and
wherein a width of the fifth area is between T/2 and T, inclusive, when measured along the first direction.

33. The secondary battery of claim 31, further comprising:
an electrode tab provided between the electrode assembly and an outside of the pouch film; and
a welding portion coupling the electrode assembly to the electrode tab,
wherein the pouch film extends from a third edge through a sixth area, the second area, and a seventh area to a fourth edge in a second direction,
wherein the second direction is different from the first direction,
wherein the welding portion has a width W when measured along the second direction, and
wherein a width of the sixth area of the pouch film is the same as or larger than (W+T/2).

34. The secondary battery of claim 29,
wherein the first sidewall of the exterior material is formed with a seam, the seam being created by bonding the first edge and the second edge using the sealing portion, and
wherein the second sidewall of the exterior material is formed seamless and without using the sealing portion.

35. The secondary battery of claim 34,
wherein the first sidewall has a first inclination with respect to the bottom layer,
wherein the second sidewall has a second inclination with respect to the bottom layer, and
wherein the second inclination is larger than the first inclination.

36. The secondary battery of claim 34, wherein the electrode assembly directly contacts the second sidewall of the exterior material.

* * * * *